(12) United States Patent
Koyano et al.

(10) Patent No.: US 6,327,415 B1
(45) Date of Patent: Dec. 4, 2001

(54) OPTICAL WAVEGUIDE MADE OF POLYMER MATERIAL AND A METHOD OF FABRICATING THE SAME

(75) Inventors: Takeshi Koyano; Yoshinori Maeno; Juro Mita; Katsuaki Kaifu, all of Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/531,322

(22) Filed: Mar. 20, 2000

(30) Foreign Application Priority Data

Aug. 26, 1999 (JP) .................................. 11-239662

(51) Int. Cl.[7] .................................................. G02B 6/00
(52) U.S. Cl. ............................................................ 385/143
(58) Field of Search ................................... 385/141–146, 385/131; 428/429, 411.1; 264/1.24, 102

(56) References Cited

U.S. PATENT DOCUMENTS

| | | | |
|---|---|---|---|
| 5,644,667 | * 7/1997 | Tabuchi | 385/49 |
| 5,716,556 | * 2/1998 | Heard | 264/1.24 |
| 5,761,350 | * 6/1998 | Koh | 385/14 |
| 5,972,516 | * 10/1999 | Kaneko et al. | 428/429 |
| 6,088,492 | * 7/2000 | Kaneko et al. | 385/14 |

* cited by examiner

*Primary Examiner*—Akm E. Ullah
(74) *Attorney, Agent, or Firm*—Venable; Robert J. Frank; Michael A. Sartori

(57) ABSTRACT

An optical waveguide having a clad and a core, the core being made of polymer material containing a repetitive unit having formula (1), (2) or (3):

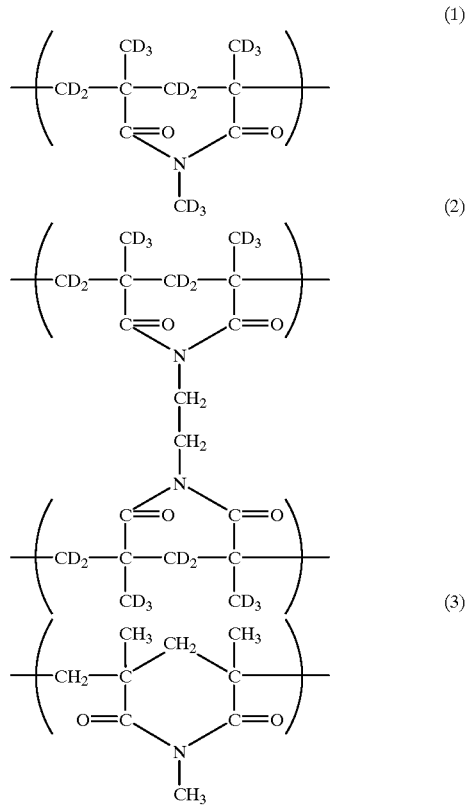

Each of these polymer materials has a higher glass transition temperature and lower water absorption than those of deuterated PMMA, has a transparency equivalent with that of deuterated PMMA, and shows neither light absorption nor scattering in the operating wavelength region. An optical waveguide with a core fabricated using these polymer materials is high in heat resistance and low in water absorption. Thus using the waveguide will successfully provide optical communication elements with an advanced durability against the environment.

8 Claims, 5 Drawing Sheets

OPTICAL WAVEGUIDE MADE OF POLYMER MATERIAL AND A METHOD OF FABRICATING THE SAME

BACKGROUND OF THE INVENTION

1. Field of the Invention

The present invention relates to polymer material used for composing optical communication parts, optical waveguides using such polymer materials and a method of fabricating the optical waveguides.

2. Description of the Background Art

In the field of telecommunications, development of optical waveguide has been recognized as a critical issue to enable large capacity communications.

Prerequisites to the materials used for composing optical communication parts such as an optical waveguide include higher transparency at wavelengths in the near-infrared range to which the wavelength of optical signals belongs and less scattering. The materials are also required to have controllability in their refractive indices since they are used to compose optical transmission paths.

Glass or other inorganic crystalline materials have conventionally been used as materials for composing optical communication parts such as an optical waveguide. These materials, however, suffer from their expensiveness and difficulty in processing.

In recent years, polymer materials, such as PMMA (polymethyl methacrylate) and PS (polystyrene), became more popular thanks to their inexpensiveness and easier processing as compared with those of glass or other inorganic crystalline materials. Use of such material can provide a film-type optical waveguide with wider area and higher flexibility than the conventionals. It becomes also possible to obtain a functional optical waveguide by introducing functional compounds or functional groups into such polymer materials.

Fabricating such an optical waveguide essentially requires a method of processing the polymer materials into a desired form. Typical of such a method has been the reactive ion etching (RIE) method using oxygen plasma. The fabrication process of a polymer-made optical waveguide by the RIE method has to be proceeded as generally shown in FIGS. 5A to 5E. Here, FIGS. 5A to 5E show schematic cross-sectional views useful for understanding the major steps in sequence for fabricating a polymer-made optical waveguide using the RIE method.

First, on a base 101, a polymer film 103a as an underclad, a polymer film 103b for forming a core, and a photoresist film 105 for forming an etching mask are formed in this order, FIG. 5A.

To obtain the etching mask corresponded to a desired patterned shape by processing the photoresist film 105, the photoresist film 105 is then subjected to selective light exposure through a photomask 107, FIG. 5B, corresponding to the patterned shape. This results in forming a latent image of the pattern in the photoresist film 105. The photoresist film 105 after exposed with the light is then developed to obtain a resist pattern 105x, FIG. 5C. The example shown here relates to a case with negative photoresist.

RIE with an oxygen-base etching gas is then carried out using the resist pattern 105x as an etchingmask 105x, and aportion of the polymer film 103b being exposed from the etching mask 105x is removed. A core 103x made of the residual portion of the polymer film 103b is thus formed on the underclad 103a, FIG. 5D.

On the specimen on which the core 103x has been formed, a polymer film 111 for forming overclad is formed to obtain an optical waveguide 113, FIG. 5E. The overclad 111 can be formed by, for example, coating on the specimen a coating fluid containing material of the overclad, and is then allowed to dry.

As for PMMA and PS, some approaches have been taken to improve transparency in the near-infrared region. More specifically, these materials show absorption ascribable to C—H bonds in their molecules in the near-infrared region, and thus deuterated PMMA, that is, PMMA whose hydrogen atoms are substituted with deuterium atoms has been developed. Deuterated PMMA shows absorption in the far-infrared region as shifted from the near-infrared region.

The above-described PMMA, PS and deuterated PMMA composing the core of the optical waveguide, however, are low in glass transition temperature. For instance, both of the PMMA and deuterated PMMA have a glass transition temperature of 107° C., so that these materials may easily be softened due to heat treatment such as soldering, if they are used to compose electronic parts for computers or so.

These materials also suffer from relatively high water absorption. Both of the PMMA and deuterated PMMA have a value of water absorption as high as 2.0%. The materials composing optical communication parts may alter their refractive indices due to water absorption, which may cause undesirable transmission error in optical communications.

The PS further has a specific problem on birefringence. In the conventional fabrication process of optical waveguides based on the RIE method, a number of steps and a long process time are necessary for forming the pattern, as is clear from the description referring to FIGS. 5A to 5E. Problems also reside in that apparatus used for the RIE method costs high and requires special skills in the operation.

SUMMARY OF THE INVENTION

It is therefore an object of the present invention to provide polymer material superior in transparency and free from scattering in the operating wavelength region.

It is another object of the present invention to provide an optical waveguide having a core made of material with higher heat resistance, lower water absorption and no birefringence.

It is still another object of the present invention to provide an optical waveguide simpler in structure and easier in fabrication process without using the RIE method.

The inventors of the present invention, after extensive studies, focused on the fact that imidated polymer material becomes higher in glass transition temperature and lower in water absorption as compared with those of the original material before imidation, which has led to the present invention.

A polymer material according to the present invention contains a repetitive unit having formula (1):

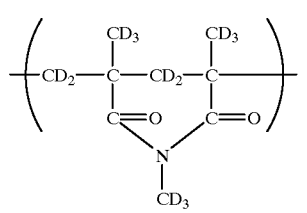
(1)

The material expressed by the formula (1) can be obtained by, for example, reacting deuterated PMMA having superior transparency in the near-infrared region with deuterated methylamine, where deuterated methylamine reacts with the ester bond portion of deuterated PMMA to effect intramolecular imidation. The resultant imide has a cyclic structure. The imidated deuterated PMMA, i.e. deuterated polymethyl methacrylimide, has a higher glass transition temperature and a lower water absorption as compared with those of deuterated PMMA, and has a transparency equivalent with that of deuterated PMMA. The material is thus favorable as the one for optical communication parts.

The present invention also claims a polymer material containing a repetitive unit having formula (2):

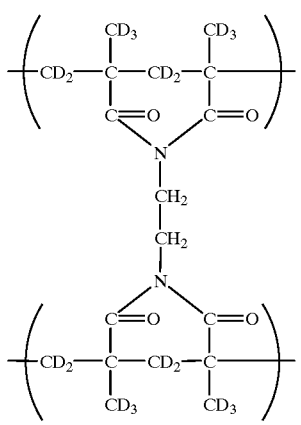
(2)

The material expressed by the formula (2) can be obtained by, for example, reacting deuterated PMMA with ethylenediamine, where etylenediamine reacts with the ester bond portion of deuterated PMMA. One repetitive unit and one amino group react each other. Since one ethylenediamine molecule has two amino groups, two repetitive units of deuterated PMMA and one ethylenediamine molecule can react. Thus the products (polymer material) of the reaction will have a structure in which two repetitive units of deuterated PMMA are crosslinked with ethylenediamine. The repetitive unit of this polymer material has two cyclic portions each of which being similar to the above-described deuterated polymethyl methacrylimide. Also this polymer material has a higher glass transition temperature and a lower water absorption as compared with those of deuterated PMMA, and has a transparency equivalent with that of deuterated PMMA. The material is thus favorable as the one for optical communication parts.

An optical waveguide of the present invention comprises a clad and a core, and the core is made of polymer material containing a repetitive unit having formula (1), (2) or (3):

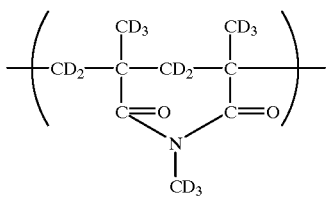
(1)

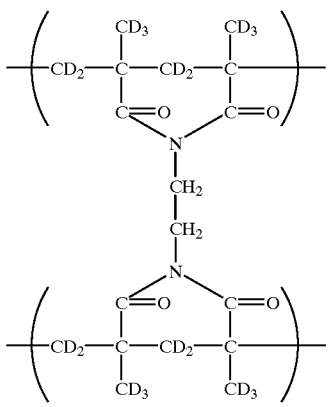
(2)

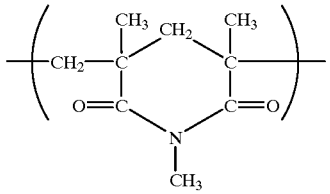
(3)

A polymer material, e.g. polydimethyl glutarimide (PMGI) expressed by the formula (3), can be obtained by, for example, reacting PMMA with methylamine, where methylamine reacts with the ester bond portion of PMMA to effect intramolecular imidation. The resultant imide has a cyclic structure. The imidated PMMA, i.e. PMGI, has a higher glass transition temperature and a lower water absorption as compared with those of PMMA, and shows neither light absorption nor scattering in the operating wavelength region. There is no problem on birefringence. The material is thus favorable as the one for forming the core.

Molecular weights of the polymer materials expressed with formulae (1), (2) and (3) can be selected to arbitrary values according to objects of their use. If these polymer materials to be formed into film by the spin coating method, it is preferable to adjust their degrees of polymerization so that their molecular weights fall within a range from 12,500 to 540,000, and more preferably from 150,000 to 540,000. The viscosity of coating fluid to be coated depends on the evaporation rate of solvent used to dissolve these polymer materials. The viscosity of the coating fluid is thus adjusted based on the molecular weights of these polymer materials and their amounts to be dissolved in the solvent. More specifically, it is preferable to adjust the viscosity of the coating fluid between 100 cP and 10,000 cP. The molecular weights of these polymer materials between 150,000 and 540,000 will facilitate the adjustment of the viscosity of the coating fluid, and polymer film with smooth surface will be obtained.

An optical waveguide with a core fabricated using these polymer materials is high in heat resistance and low in water absorption. Thus using the optical waveguide will successfully provide optical communication parts with an advanced durability against the environment.

In the optical waveguide of the present invention, the clad is preferably made of a material having a smaller refractive index than those of the above polymer materials. PMMA, for example, is recommendable as a material for the clad.

According to another constitution of the optical waveguide of the present invention, the optical waveguide comprises a substrate made of inorganic material; a core formed on the substrate; and an overclad made of polymer and formed on the substrate to cover the core; refractive indices of the substrate and the overclad being approximately the same, and the ratio $(n_1-n_2)/n_1$ of the difference of the refractive index $n_1$ of the core from that $n_2$ of the substrate or overclad to the refractive index $n_1$ of the core being within a range from 0.3 to 3.0%.

This allows the substrate to be used as an underclad (lower clad) in the conventional sense and provides an optical waveguide with a simpler structure. Since the ratio of the difference in refractive index between the core and the substrate or overclad to the refractive index of the core falls within a range from 0.3 to 3.0%, light used for telecommunications can successfully be transmitted over the optical waveguide based on total reflection.

Glass, being widely used as a substrate material, is recommendable as an inorganic material composing the substrate of the optical waveguide. Polymer composing the overclad can be of a refractive index which matches well with that of the substrate, and is exemplified as UV (ultra violet) curing or setting resin, thermosetting resin and so forth.

The inorganic material of the substrate and the polymer of the overclad are selected so that their refractive indices approximately coincide with each other. When barium borosilicate glass is used as the inorganic material, for example, an UV setting resin (manufactured by NTT Advanced Technology Corporation, product code No. 8101) is typically used as a polymer since it has a refractive index substantially equal to 1.528.

A typical optical waveguide comprises a substrate made of barium borosilicate glass; a core made of PMGI and formed on the substrate; and an overclad made of UV setting resin and formed on the substrate so as to cover the core; thus allowing the ratio of the difference in refractive index between the core and the substrate or overclad to the refractive index of the core to fall within a range from 0.3 to 3.0%.

According to the method of fabricating an optical waveguide of the present invention, the optical waveguide comprising a core on a base is formed by the steps of: forming on the base a core-forming material layer with a positive resist property; subjecting the core-forming material layer to light exposure through a photomask which shadows a core-formative area of the core-forming material layer; and, developing the core-forming material layer after exposed by dipping it into developing solution to leave a portion of the core-forming material layer corresponding to the core-formative area.

By contrast to the conventional process of forming a core on a base, in which a core-forming material layer is formed by coating on a base, a resist pattern is then formed by photolithography, and the core-forming material layer is etched by the RIE method using the resist pattern as an etching mask, the present invention allows core forming only by the steps of forming the core-forming material layer on the base and of effecting light exposure and development process to the core-forming material layer. Thus an optical waveguide can be fabricated quite easily with a lesser number of process steps without using the RIE method.

It is preferable to use, as a core-forming material with a positive photoresist property, PMGI containing a repetitive unit expressed by formula (3). This material is known to cleave at three bonds within a single repetitive unit when irradiated by energy beam with a wavelength of 300 nm or shorter (deep UV light, for example). Formula (4) simply expresses this reaction.

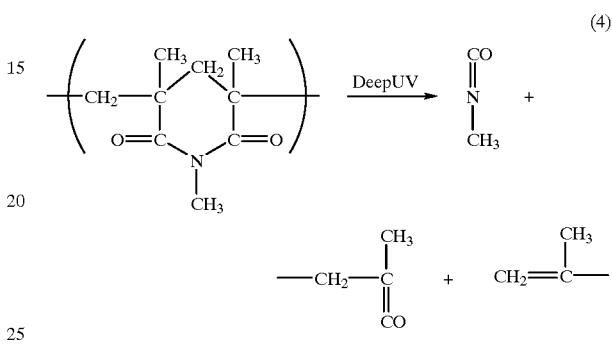

(4)

The light exposed area of the core-forming material layer becomes soluble to developing solution due to the bond cleavage as defined by formula (4).

When developed, the exposed area dissolves to the developing solution to be removed, while the core-formative portion remains. Thus a core can be fabricated in a manner quite easier than in the conventional process.

A base in a context of the present invention typically refers to an underclad (lower clad) formed on an arbitrary base member, and a substrate (including that in a form of film) available as an underclad.

The above-described arbitrary base member for forming the underclad refers to an base member arbitrarily selected depending on a design of the optical waveguide, and either a base member made of inorganic or organic material is available. More specifically, it can be selected from a semiconductor substrate made of silicon or compound semiconductor; a glass substrate; a ceramic substrate; and base material made of arbitrary polymer material other than that used for the underclad. The arbitrary base member can, of course, be an intermediate product in which other electronic parts or optical parts are already incorporated.

A substrate available as an underclad is, for example, made of a material having a refractive index approximately the same with that of the overclad. A substrate made or glass or other inorganic materials is typically available.

A polymer material as a core-forming material preferably has a molecular weight within a range from 12,500 to 540,000.

When the spin coating method is adopted to form the core-forming material layer on the base, the viscosity of a coating fluid to be coated on the base will preferably be within a range from 100 cP to 10,000 cP. Using the coating fluid having a viscosity within the above range allows a desired thickness of a layer to be formed. It becomes also possible to smoothen the surface of the layer formed by the spin coating method. The viscosity of the coating fluid is adjusted based on the molecular weight of the polymer material and the amount of the polymer material to be dissolved in the solvent. It is thus preferable to select the molecular weight of the polymer material between 150,000 and 540,000 to adjust the viscosity of the coating fluid within the above range. The molecular weight is more preferably selected within a range from 150,000 to 540,000.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

Figure 1A:
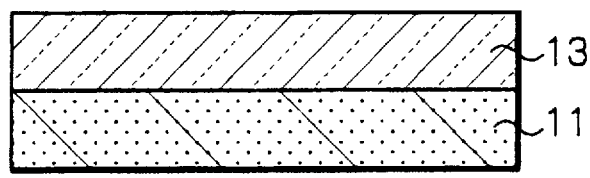
FIGS. 1A to 1D are schematic process diagrams useful for understanding an embodiment of the present invention.
Figure 1B:
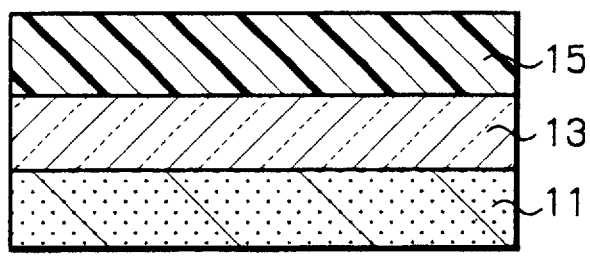
Figure 1C:
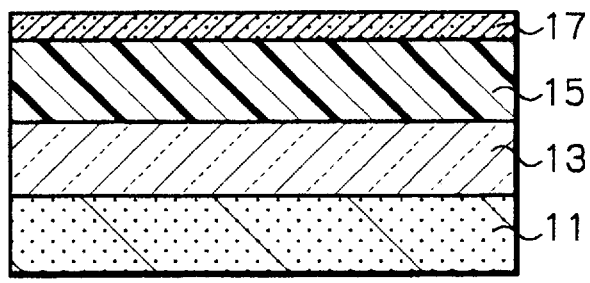
Figure 1D:
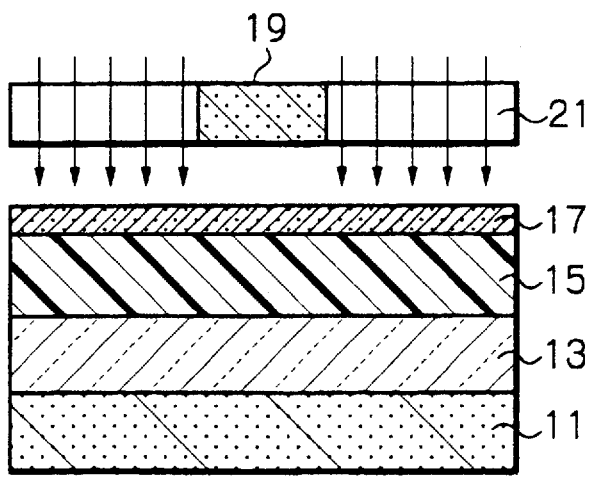
Figure 2A:
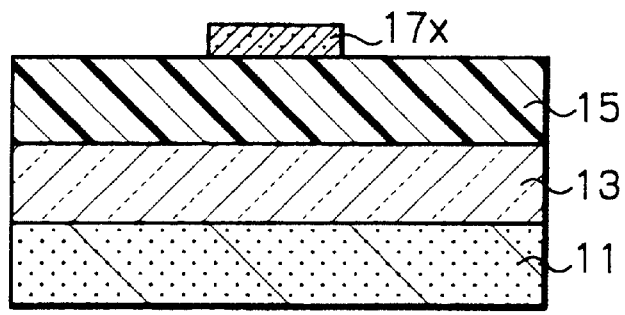
FIGS. 2A to 2D are schematic process diagrams, as continued from FIGS. 1A to 1D, useful for understanding further processes of the embodiment.
Figure 2B:
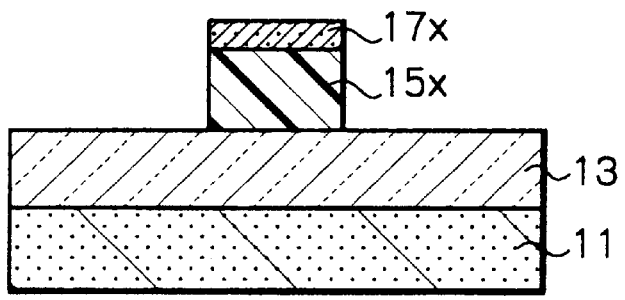
Figure 2C:
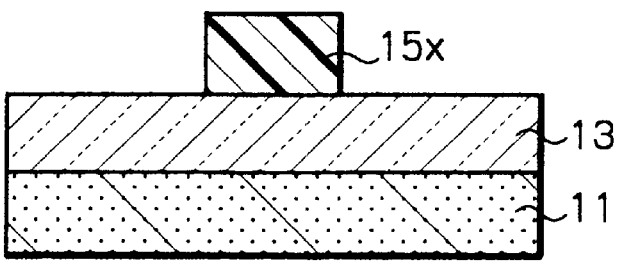
Figure 2D:
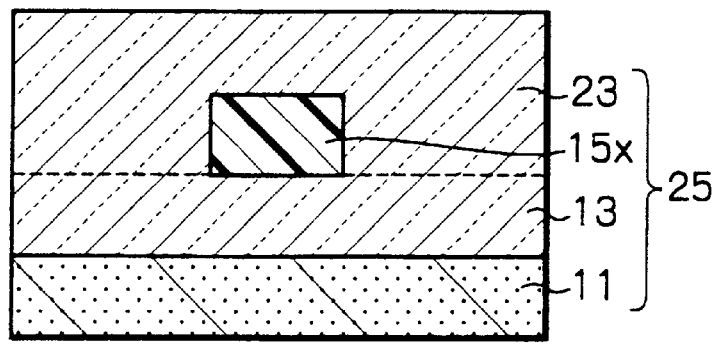

Preferred embodiments of the polymer material, optical waveguide and a method of fabricating thereof in accordance with the present invention will be described hereinafter. Materials, equipment, consumption of the materials, numerical conditions including temperature and pressure adopted in the fabrication processes are mare examples preferred within a scope of the present invention. The polymer materials, therefore, are not limited to those prepared using the conditions described below.

First Embodiment

In this first embodiment, a polymer material containing a repetitive unit having formula (1) is prepared as described below.

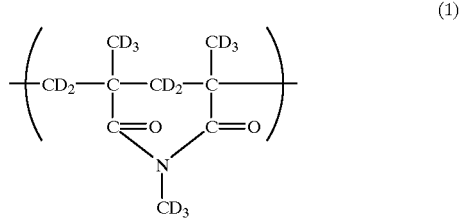

(1)

Ten grams of deuterated polymethyl methacrylate (deuterated PMMA, product of Sowa Kagaku Co., Ltd.; molecular weight 137,700; product code No. P818) as a source of the polymer material is added to 90 g of tetrahydrofuran (THF) as a solvent. The mixture is stirred at room temperature for 24 hours to ensure thorough solubilization. The obtained solution is denoted as a first solution. A second solution is separately prepared by dissolving deuterated methylamine (product of Kanto Kagaku Co., Ltd.) in methanol to obtain a 50 wt % solution. Twenty grams each of the first and second solutions are then mixed and allowed to react at 260° C. for 2 hours.

It is supposed that imidation as defined by the following equation (5) proceeds during the reaction:

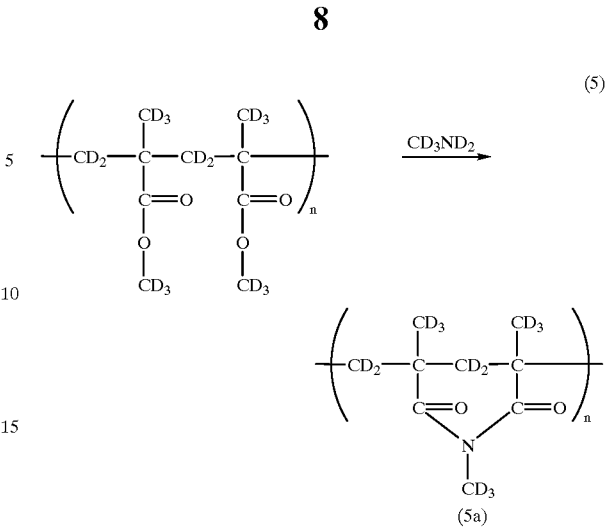

where n represents the degree of polymerization, and can be an integer of unity or larger.

After the reaction, the reaction mixture is allowed to stand for natural cooling to the room temperature, which is followed by addition of 500 ml of pure water. A product supposed to be the polymer material containing the repetitive unit expressed by formula (1) deposits. That is, a polymer material expressed by formula (5a) on the right side of the reaction equation (5) is successfully synthesized. The product is washed with water and dried.

To confirm whether the product is a real polymer material expressed by formula (1) (more particularly, by formula (5a)), the obtained product is analyzed by infrared spectroscopy. For this, the product is melted at 260° C. to be molded into a pellet, and is then subjected to the measurement.

Absorption spectra characteristic to methacrylimide were observed at wave numbers of 1720 $cm^{-1}$, 1663 $cm^{-1}$ and 750 $cm^{-1}$, which proved imidation.

The glass transition temperature of this polymer material was measured as 165° C., which was found to be significantly raised since the glass transition temperature of the conventional deuterated PMMA is 107° C. Thus heat resistance of the polymer material can be improved.

The pellet of the polymer material was also subjected to the measurement of water absorption, in which the pellet was allowed to stand in a hot and humid environment with a humidity of 90% and a temperature of 90° C. for 100 hours before the measurement. Water absorption of the pellet was 0.9%, which was found to be lowered since the water absorption of deuterated PMMA is 2.0%.

A measurement of the refractive index of the polymer material gave a value of 1.51, which was slightly higher than that of deuterated PMMA. The refractive indices measured for the TE (transverse electric) mode and TM (transverse magnetic) mode, both of which are polarization modes, were the same. It was thus indicated that the material does not show birefringence.

In the following paragraphs, an example of fabrication processes for an optical waveguide using the polymer material of formula (1) obtained above will be described referring to FIGS. 1A to 1D and FIGS. 2A to 2D. The figures referred to in this specification show nothing but a schematic expression of shape, dimension and arrangement of individual components so as to help understanding. In these figures, the like components will follow the same reference numerals, and their repetitive description may be omitted.

FIGS. 1A to 1D are process diagrams useful for understanding one typical embodiment for fabricating an optical waveguide using the polymer material of the present invention. Those figures depict the states of the specimen with its cross-sectional end at the major steps of the process. FIGS. 2A to 2D are schematic process diagrams as continued from FIGS. 1A to 1D.

The structure of the optical waveguide includes an underclad provided on a substrate, a linear core provided on the underclad, and an overclad provided so as to cover the core. In this embodiment, the optical waveguide will be fabricated according to steps [1] to [3] as described below.

[1] The underclad is formed on the substrate.

Three grams of polymethyl methacrylate (PMMA, product of Sowa Kagaku Co., Ltd.; molecular weight 75,000; product code No. 307), as an example of a material for the underclad whose refractive index is smaller than that for deuterated polymethyl methacrylimide expressed by formula (1), is added to 7 g of 2-methoxyethyl acetate as a solvent. The mixture is stirred at room temperature for 12 hours to ensure thorough solubilization, and then filtrated through a filter (pore size 0.45 $\mu$m, PTFE membrane), to prepare a 30 wt % coating fluid of PMMA.

The coating fluid is then spin-coated on a silicon substrate 11 at 3,000 rpm for 30 seconds. The obtained coated film is then dried at 95° C. for 6 hours in a furnace conditioned to the atmospheric environment. A PMMA film of approx. 7 $\mu$m thick as an underclad 13 is thus formed on the silicon substrate 11, FIG. 1A.

[2] Next, a linear core is formed on the underclad.

Two grams of deuterated polymethyl methacrylimide of formula (1) obtained above is added to 8 g of 2-methoxyethyl acetate as a solvent. The mixture is stirred at room temperature for 12 hours to ensure thorough solubilization, and then filtrated through a filter (pore size 0.45 $\mu$m, PTFE membrane), to prepare a 20 wt % coating fluid of deuterated polymethyl methacrylimide.

The coating fluid is then spin-coated on the underclad 13 at 3,000 rpm for 30 seconds. The obtained coated film is then dried at 95° C. for 6 hours in a furnace conditioned to the atmospheric environment. A deuterated polymethyl methacrylimide layer 15 of approx. 4 $\mu$m thick is thus formed on the underclad 13, FIG. 1B.

A silicon-containing resist (DLR (trade name): product of NTT Advanced Technology Corporation) is then spin-coated on the deuterated polymethyl methacrylimide layer 15 at 3,000 rpm for 30 seconds. The obtained coated film is then dried at 100° C. for 20 minutes in a furnace conditioned to the atmospheric environment, to form a resist layer 17, FIG. 1C. A photomask 21 having a linear pattern 19 is set above the resist layer 17, the pattern being a 10-$\mu$m-wide line-and-space. Using the photomask 21, light is exposed for 10 seconds using an exposure apparatus called mask aligner, FIG. 1D. Light exposure is graphically expressed with the arrows in FIG. 1D. This process is continuously followed by a development process. The resist layer 17 is thus transformed into a linear resist pattern 17x, FIG. 2A. Etching with aid of oxygen plasma is then carried out to remove the portion of the deuterated polymethyl methacrylimide layer 15 not covered with the resist pattern 17x, FIG. 2B. The remaining resist pattern 17x is then removed with a stripping solution, FIG. 2C. A core 15x, having a 10-$\mu$m-wide line-and-space pattern and made of deuterated polymethyl methacrylimide, is thus formed on the underclad 13, FIG. 2C.

[3] Next, an overclad is formed so as to cover the core.

Similarly to the forming process of the underclad as described in process [1], a 30 wt % coating fluid of PMMA is prepared. The coating fluid is then coated on the underclad 13 so as to cover the core 15x. Here, the spin coating method is adopted and coating is carried out at 3000 rpm for 30 seconds. The obtained coated film is then dried at 95° C. for 6 hours in a furnace conditioned to the atmospheric environment. An overclad 23 of approx. 7 $\mu$m thick is thus formed over the core 15x, FIG. 2D.

The obtained laminate 25 is then polished on its both side faces including the both end surface of the linear core 15x to complete an optical waveguide.

According to this embodiment, an optical waveguide in which the core 15x being made of deuterated polymethyl methacrylimide, and the underclad 13 and overclad 23 being made of polymethyl methacrylate is fabricated. Thus obtained optical waveguide was input with near-infrared light of 1,330 nm, which is used in optical communications, to measure the transmissive attenuation. It was found that a substantially constant value (approx. 0.4 dB/cm) was obtained.

Second Embodiment

A polymer material containing a repetitive unit having formula (2) is prepared, for example, as described below.

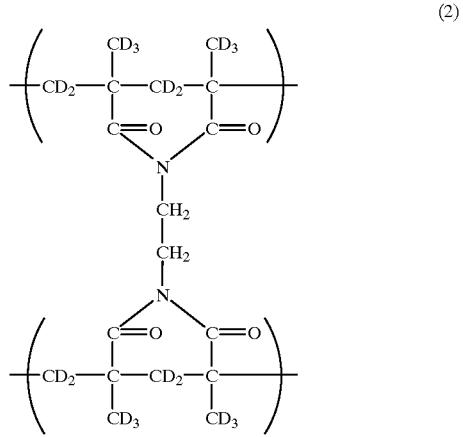

(2)

With reference to the instant, second embodiment, an example of forming a film of the polymer material expressed by the above formula (2) will be described. Three grams of deuterated PMMA (product of Sowa Kagaku Co., Ltd.; molecular weight 137,700; product code No. P818) as a source of the polymer material is added to 7.0 g of 2-methoxyethyl acetate as a solvent. The mixture is stirred at room temperature for 12 hours to ensure thorough solubilization, and then filtrated through a filter (pore size 0.45 $\mu$m, PTFE membrane), to prepare a 30 wt % coating fluid of deuterated PMMA.

The coating fluid is then spin-coated at 3,000 rpm for 30 seconds on a glass substrate with a refractive index of 1.459. The obtained coated film is then dried at 95° C. for 6 hours in a furnace conditioned to the atmospheric environment. A deuterated PMMA film of approx. 7 $\mu$m thick is thus formed on the glass substrate.

The glass substrate along with the deuterated PMMA film formed thereon are then dipped in a 20 wt % ethylenediamine (Kanto Kagaku Co., Ltd.) solution in methanol for 12 hours. The temperature of the solution is then raised to 300° C. while keeping the substrate dipped therein, and kept at this temperature for 2 hours.

It is supposed that crosslinking as defined by the following formula (6) proceeds during the reaction:

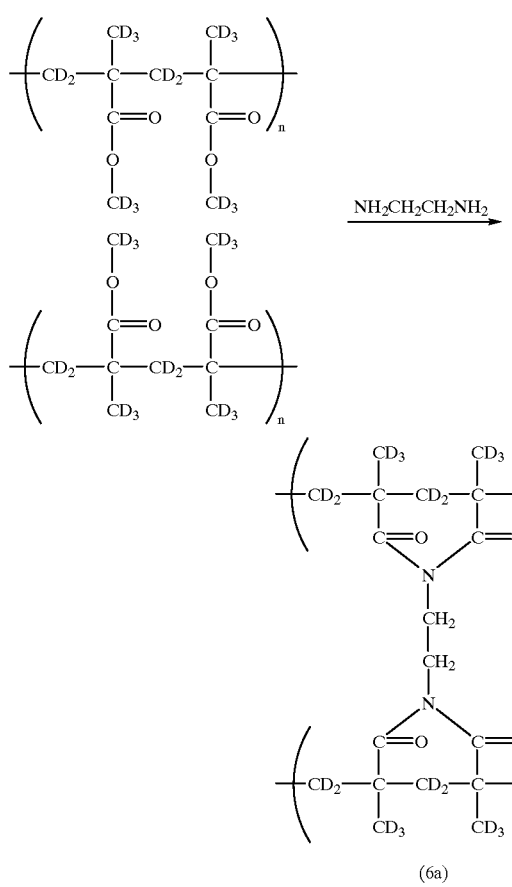

(6)

(6a)

where n represents the degree of polymerization, and is an integer of unity or larger. After the reaction, the film is washed with water and dried.

The film made of the polymer material containing the repetitive unit expressed by formula (2) is thus formed. That is, a polymer material expressed by formula (6a) on the right side of the reaction equation (6) is successfully synthesized.

Thus obtained film of the polymer material was input with near-infrared light of 1,330 nm, which is used in optical communications, to measure the transmissive attenuation. It was found that an substantially constant value (approx. 0.4 dB/cm) was obtained independent of locations.

A glass transition temperature of the film was measured as 180° C. by thermal analysis. This is by 70° C. or more and higher than the glass transition temperature of the conventional deuterated PMMA, proving that the film has a superior heat resistance.

The water absorption of the film, measured in a similar manner to the first embodiment, was 0.5%, which was one-fourth of that for deuterated PMMA. Also water absorption was thus successfully reduced.

In order to fabricate an optical waveguide having the core 15x, which is made of material defined by formula (2), the same processes may advantageously be applicable except those for preparing the core 15x. More specifically, the core 15x is formed by the processes described with reference to the second embodiment, instead of the step [2] described with reference to the first embodiment. The clad including the underclad 13 and the overclad 23 may be formed by the steps [1] and [3] described on the first embodiment.

The polymer material containing the repetitive unit expressed by formula (2) (more specifically, the polymer material expressed by formula (6a)) can be prepared by a method not limited to that described with reference to the second embodiment but the steps described with reference to the first embodiment, for example.

More specifically, the second solution in the first embodiment can be replaced with a 20 wt % ethylenediamine solution in methanol, with the remaining features such as processes and materials being the same as the first embodiment. It can easily be confirmed by the infrared absorption spectrum whether or not the polymer material thus obtained is really a polymer material expressed by formula (6a).

Third Embodiment

Polydimethyl glutarimide (PMGI) containing a repetitive unit having formula (3), a kind of polymer material, is prepared as described below.

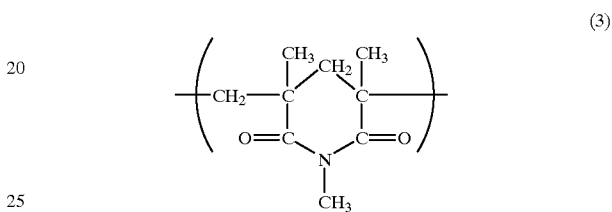

(3)

Ten grams of PMMA (product of Sowa Kagaku Co., Ltd.; molecular weight 540,000; product code No. 037D) as a source of PMGI is added to 90 g of tetrahydrofuran (THF) as a solvent. The mixture is stirred at room temperature for 24 hours to ensure thorough solubilization. The obtained solution is denoted as a first solution.

A second solution is separately prepared by dissolving methylamine (product of Kanto Kagaku Co., Ltd.) in methanol to obtain a 50 wt % solution. The solvent for dissolving methylamine is not limited to methanol, but any kind of solvent is available as far as it does not inhibit the reaction between PMMA and methylamine. Twenty grams each of the first and second solutions are then mixed and allowed to react at 260° C. for 2 hours in an autoclave.

It is supposed that imidation as expressed by the following equation (7) proceeds during the reaction:

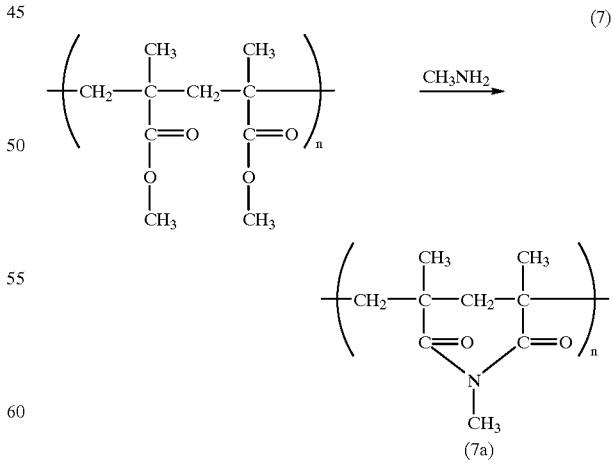

(7)

(7a)

where n represents the degree of polymerization, and can be an integer of unity or larger.

After the reaction, the reaction mixture is allowed to stand for natural cooling to the room temperature, which is followed by addition of 500 ml of pure water. A product supposed to be PMGI containing the repetitive unit expressed by formula (3) deposits. That is, PMGI expressed by formula (7a) on the right side of the reaction equation (7) is successfully synthesized. The product is washed with water and dried.

To confirm whether the product is a real PMGI expressed by formula (3) (more particularly, by formula (7a)), the obtained product is analyzed by infrared spectroscopy. For this, the product is melted at 260° C. to be molded into a pellet, and was then subjected to the measurement.

The absorption spectra characteristic to methacrylimide were observed at wave numbers of 1720 cm$^{-1}$, 1663 cm$^{-1}$ and 750 cm$^{-1}$, which proved that the product was PMGI.

The glass transition temperature of this polymer material was measured as 195° C., which was found to be significantly raised since the glass transition temperature of the conventional deuterated PMMA is 107° C. Thus heat resistance of the polymer material can be improved.

The pellet of the polymer material was also subjected to the measurement of water absorption, in which the pellet was allowed to stand in a hot and humid environment with a humidity of 90% and a temperature of 90° C. for 100 hours before the measurement. The water absorption of the pellet was 0.9%, which was found to be lowered since the water absorption of deuterated PMMA is 2.0%.

The measurement of the refractive index of the polymer material gave a value of 1.53, which was slightly higher than that of deuterated PMMA. The refractive indices measured for the TE (transverse electric) mode and TM (transverse magnetic) mode, both of which are polarization modes, were the same. It was thus indicated that the material does not show birefringence.

Figure 3:
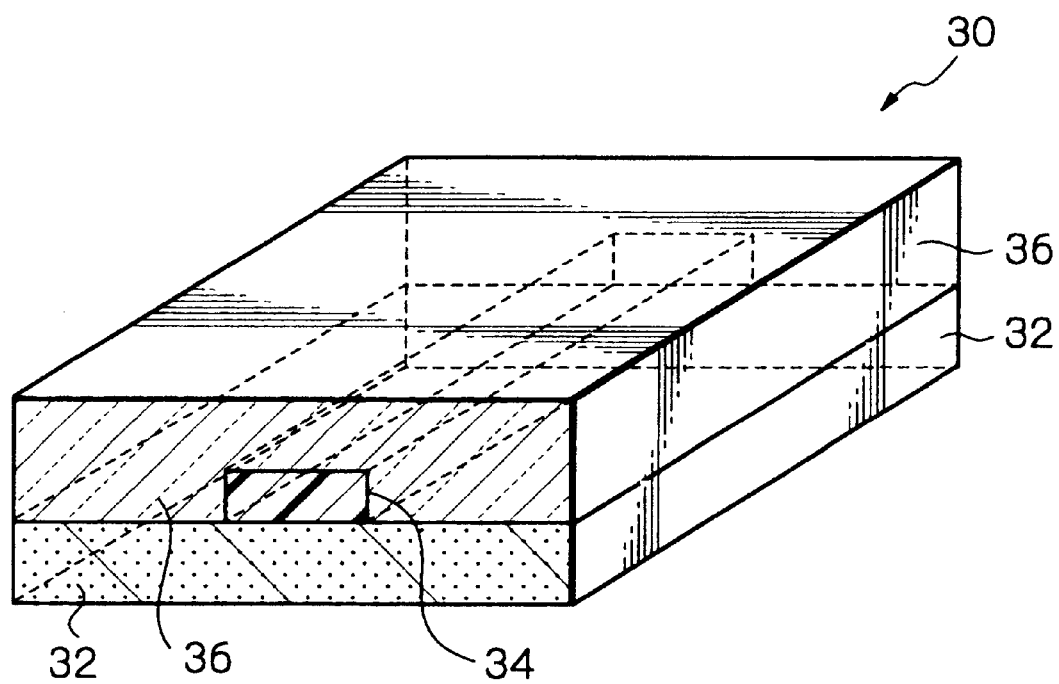
FIG. 3 is a schematic perspective view showing an optical waveguide to which the present invention is applied.
Figure 4A:
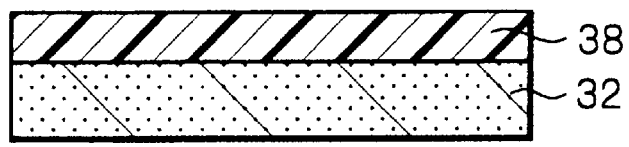
FIGS. 4A to 4D are schematic process diagrams, like FIGS. 1A to 1D, useful for understanding another embodiment of the present invention.
Figure 4B:
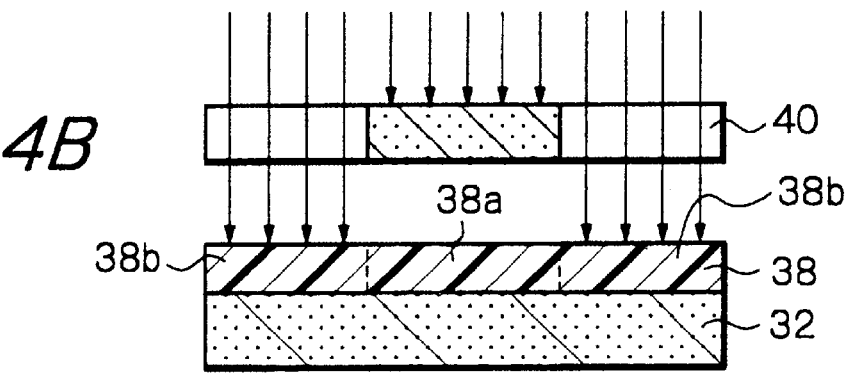
Figure 4C:
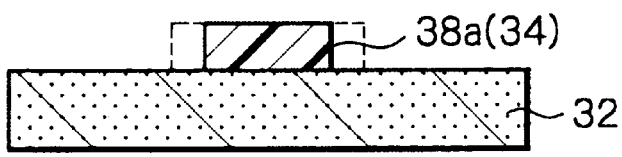
Figure 4D:
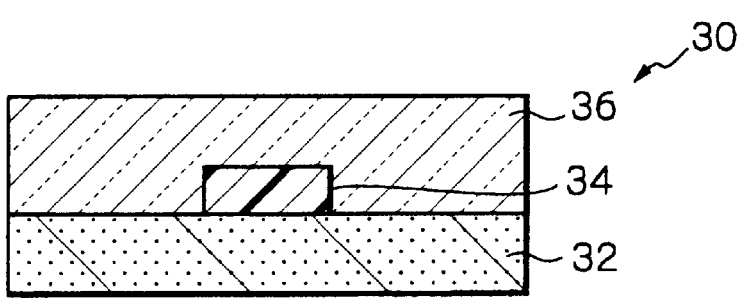
Figure 5A:
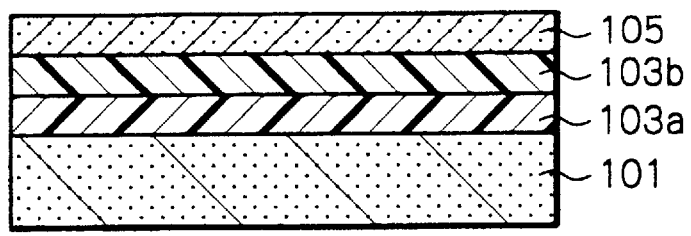
FIGS. 5A to 5E are schematic process diagrams, like FIGS. 1A go 1D, useful for understanding a conventional process for fabricating an optical waveguide.
Figure 5B:
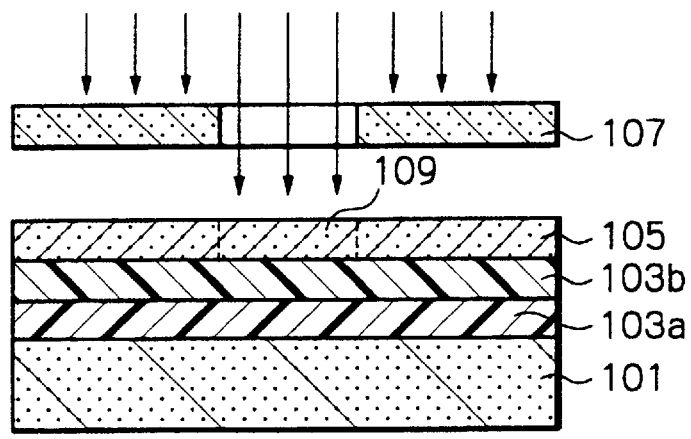
Figure 5C:
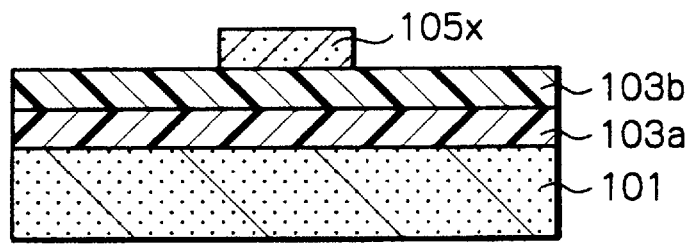
Figure 5D:
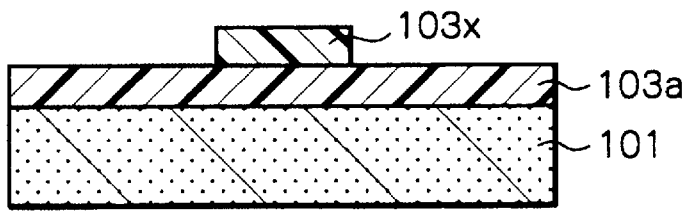
Figure 5E:
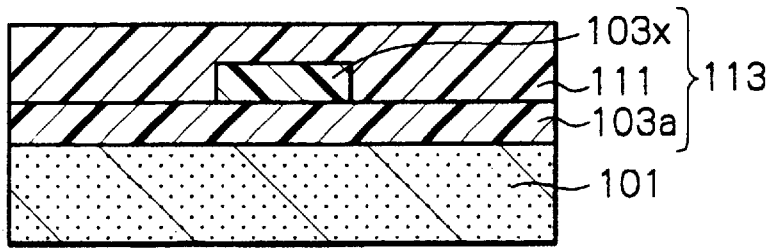

Next, an example of fabricating an optical waveguide using PMGI having formula (3) prepared above will be described referring to FIG. 3 and FIGS. 4A to 4D. FIG. 3 is a schematic perspective view of an optical waveguide of the present invention. FIGS. 4A to 4D are process diagrams useful for understanding a fabrication process of an optical waveguide of the present invention. FIGS. 4A to 4D respectively indicate the states of the specimen with its cross-sectional end at the major step of the process.

Referring to FIG. 3, an optical waveguide 30 comprises a substrate 32 made of inorganic material; a core 34 formed linearly on the substrate 32; and an overclad 36 made of polymer and formed on the substrate 32 so as to cover the core 34; refractive indices of the substrate 32 and the overclad 36 being approximately the same. In this embodiment, a glass substrate is selected as the substrate 32, where the glass substrate being in particular a barium borosilicate glass substrate with a refractive index of 1.528. An UV setting resin is selected as a polymer for composing the overclad 36, where the polymer being in particular an UV setting resin with a refractive index of 1.528 (product of NTT-Advanced Technology Corporation, product code No. 8101).

The core 34 is made of a material such that the relative difference, or the ratio $(n_1-n_2)/n_1$ of the difference of the refractive index $n_1$ of the core from that $n_2$ of the substrate or the overclad to the refractive index $n_1$ of the core, falls within a range from 0.3 to 3.0%. Here the PMGI prepared above is used as a material composing the core 34.

In this embodiment, the optical waveguide 30 will be fabricated according to the following steps [1] to [4]:

[1] A core-forming material layer 38 is formed on the substrate 32.

A barium borosilicate glass substrate (refractive index 1.528, product of Corning Incorporated, product code No. 7059) is procured as the substrate 32.

Next, 2.0 g of PMGI prepared above is added to 8.0 g of a solvent comprising a 5:1 mixture of cyclopentanone (product of Kanto Kagaku Co., Ltd.) and tetrahydrofurfuryl alcohol (product of Kanto Kagaku Co., Ltd.). The mixture is stirred at 60° C. for 12 hours to ensure thorough solubilization. The solvent for PMGI is not limited to that described above, and available solvents include THF, DMAC (dimethylacetamide), methyl acetate, ethyl acetate and so forth.

The mixture is then filtrated through a filter (pore size 0.45 μm, PTFE membrane, product of Toyo Roshi Kaisha Ltd.), by which insoluble part of PMGI is filtered off. The filtrate is obtained as a coating fluid of PMGI at a concentration of approx. 20 wt %.

The thus prepared coating fluid is then spin-coated on the substrate 32 made of barium borosilicate glass. Here, for example, approx. 5 g of the PMGI coating fluid is placed on a 3-inch-square substrate 32 (where 1 inch equals to approx. 2.54 cm) and the substrate 32 is then preliminarily rotated at 1,000 rpm for 10 seconds. The rotation speed is gradually raised in the next 20 seconds up to 3,000 rpm, and this speed is kept for 30 seconds for main rotation. The rotation of the substrate 32 is then gradually slowed down to stop in the next 10 seconds.

The substrate 32 on which a PMGI coated film is formed is then heated to dryness for 5 minutes at 250° C. on a hot plate in the atmospheric environment. A PMGI layer of approx. 5 μm thick as a core-forming material layer 38 is thus formed on the barium borosilicate glass substrate 32. The refractive index of the PMGI layer was measured to be 1.540, FIG. 4A.

[2] Next, the core-forming material layer 38 is light-exposed through a photomask 40 which shadows a core-formative area 38a of the core-forming material layer 38.

In this embodiment, a photomask 40 having a linear pattern is set above the PMGI layer 38, the pattern being a 10-μm-wide line-and-space for example. Using the photomask 40, deep-UV light, i.e. an energy beam with a wavelength of 300 nm or shorter, is exposed for 2 hours using an exposure apparatus called mask aligner. The light exposure is graphically expressed with the arrows in FIG. 4B. PMGI in the exposed area 38b becomes soluble to developing solution due to cleavage at the intramolecular bonds.

[3] Next, the core-forming material layer 38 after the light exposure is dipped in the developing solution to leave a portion of the core-forming material layer in the core-formative area 38a.

More specifically, as continued from the exposure process, development process is carried out. An aqueous solution of approx. 3 wt % tetraethylammonium hydroxide solution is used as the developing solution. The substrate 32 together with the PMGI layer 38 are dipped in this developing solution at 23° C. for 10 minutes. The portion 38b of the PMGI layer exposed by deep-UV light is dissolved and removed, where residual PMGI layer 38a is to be a linear core pattern 34 (also simply referred as core) After that, the substrate 32 on which the core 34 is formed is washed with pure water and then dried, FIG. 4C.

An observation of the core 34 by scanning electron microscopy showed the core 34 being formed in a 5-μm-wide linear form, which is thinner than a 10-μm-pitch line-and-space pattern of the photomask 40. This sort of thinning is ascribable to diffraction of the light into the non-exposing area 38a, since a thickness of 5 μm of the PMGI layer 38 is much larger than that of ordinary photoresist layer, and the exposure time of deep-UV light is significantly longer.

It is thus required to adjust the photomask 40 assuming such thinning of the post-exposure pattern. The core 34 made of PMGI is thus formed on the barium borosilicate glass substrate 32.

[4] Next, an overclad 36 is formed so as to cover the core 34.

In this embodiment, an UV setting resin with a refractive index of 1.528 (product of NTT-Advanced Technology Corporation, product code No. 8101), which is the same as that of the substrate 32, is selected as a polymer for composing the overclad 36. The UV setting resin is coated on the substrate 32 so as to cover the core 34. Here the coating is carried out at 3,000 rpm for 30 seconds using the spin coating method. The obtained, coated film is exposed with ultraviolet radiation from a high-pressure mercury lamp for 5 to 10 minutes to be hardened. The substrate 32 on which the coated film is formed is then annealed at 80° C. for 2 hours in a furnace conditioned to the atmospheric environment, to complete polymerization reaction of the coated film. An approx. 30-$\mu$m-thick overclad 36 is thus formed over the core 34, FIG. 4D.

In this embodiment, the ratio $(n_1-n_2)/n_1$ of the difference of the refractive index $n_1$ of the core 34 from that $n_2$ of the clad (i.e. substrate 32 and overclad 36) to the refractive index $n_1$ of the core is 0.78%. That is, the ratio of the difference in refractive index of the core 34 and the clad 32, 36 to the refractive index of the core 34, or the normalized difference, falls within a range from 0.3 to 3.0%, so that light can satisfactorily be transmitted based on total reflection.

The obtained laminate is then polished on its both side faces including the both end surface of the linear core 34 to complete an optical waveguide of 2 cm long, see FIG. 3.

According to this embodiment, obtained is the optical waveguide having a novel structure comprising the glass substrate 32; the core 34 provided on the glass substrate 32; and the overclad 36 provided on the substrate 32 so as to cover the core 34 and made of polymer; where the core 34 being made of PMGI.

The thus obtained optical waveguide 30 was input with 633 nm light, which is a common wavelength in optical communications, to measure transmissive attenuation. It was found that a substantially constant value (approx. 2.0 dB/cm) was obtained independent of locations.

Although the core 34 was made of PMGI in this embodiment for the case in which the optical waveguide 30 comprises the substrate made of inorganic material; the core 34; and the overclad made of polymer; the material is not limited thereto, and any other material is available for the core 34 as far as the ratio of the difference in refractive index between the clad (substrate 32 and overclad 36) and the core 34 to the refractive index of the core 34 can fall within a range from 0.3 to 3.0%.

Inorganic material composing the substrate 32 and polymer composing the overclad 36 can arbitrarily be selected so far as their refractive indices near ly coincide.

When the core of the optical waveguide is formed using PMGI, constitution of the other parts of the optical waveguide is not limited to that having the substrate and the overclad, but can be such that the underclad is formed between the substrate and the core. In such a case, the substrate is not necessarily be made of inorganic material and arbitrary kind of substrate available.

In this embodiment, the core made of PMGI is fabricated by exposing the core-forming material layer and then by the development process. The material for the core thus fabricated is not limited to PMGI, but can be one having a positive photoresist property, and having a refractive index to which the ratio of the difference in refractive index from the clad falls within a range of 0.3 to 3.0%.

The entire disclosure of Japanese patent application Nos. 266422/1998 and 239662/1999 filed on Sep. 21, 1998 and Aug. 26, 1999, respectively, including the specifications, claims, accompanying drawings and abstracts of the disclosures are incorporated herein by reference in their entirety.

While the present invention has been described with reference to the particular illustrative embodiments, it is not to be restricted by those embodiments. It is to be appreciated that those skilled in the art can change or modify the embodiments without departing from the scope and spirit of the present invention.

What is claimed is:

1. An optical waveguide comprising a clad and a core, said core being made of polymer material containing a repetitive unit having either one of formulae (1) and (2):

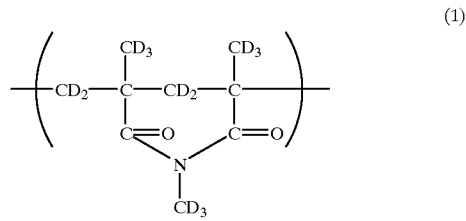

(1)

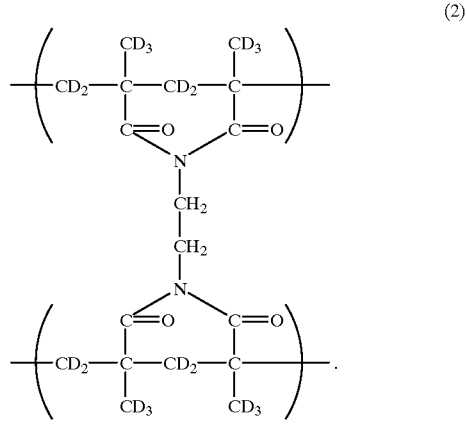

(2)

2. An optical waveguide according to claim 1, wherein said clad is made of polymethyl methacrylate.

3. An optical waveguide according to claim 1, wherein said clad comprises an underclad provided under said core, and an overclad provided over said underclad for enclosing said core together with said underclad.

4. An optical waveguide comprising a clad and a core, said core being made of polymer material containing a repetitive unit having formula (3):

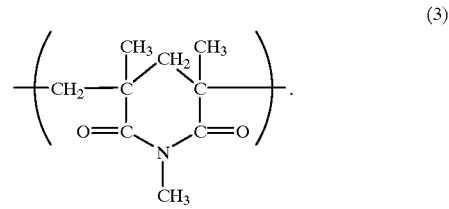

(3)

5. An optical waveguide according to claim 4, wherein said clad comprises ultra-violet setting resin.

6. An optical waveguide according to claim 4, wherein said clad comprises an underclad provided under said core, and an overclad provided over said underclad for enclosing said core together with said underclad.

7. An optical waveguide according to claim 4, further comprising a substrate made of inorganic material, said core being provided on said substrate;

said clad comprising an overclad provided on said substrate to cover said core and made of polymer;

said substrate and said overclad having a refractive index ($n_2$) substantially equal to each other, said substrate, said overclad and said core having refractive indices defined by a ratio ($n_1-n_2$)/($n_1$) of a difference of the refractive index ($n_1$) of said core from the refractive index ($n_2$) of said substrate or said overclad to the refractive index ($n_1$) of said core falling within a range from 0.3 to 3.0%.

8. An optical waveguide according to claim 7, wherein said inorganic material is glass.

* * * * *